US011210074B2

(12) United States Patent
Ince et al.

(10) Patent No.: US 11,210,074 B2
(45) Date of Patent: Dec. 28, 2021

(54) ON-DEMAND BINARY TRANSLATION STATE MAP GENERATION

(71) Applicant: Intel Corporation, Santa Clara, CA (US)

(72) Inventors: Tugrul Ince, Santa Clara, CA (US); Koichi Yamada, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 15/194,262

(22) Filed: Jun. 27, 2016

(65) Prior Publication Data
US 2017/0371634 A1 Dec. 28, 2017

(51) Int. Cl.
*G06F 8/52* (2018.01)
*G06F 9/455* (2018.01)

(52) U.S. Cl.
CPC ............ *G06F 8/52* (2013.01); *G06F 9/45516* (2013.01)

(58) Field of Classification Search
CPC ............................... G06F 8/52; G06F 9/45516
See application file for complete search history.

(56) References Cited

U.S. PATENT DOCUMENTS

| 5,930,509 | A | 7/1999 | Yates et al. |
| 6,631,514 | B1 | 10/2003 | Le |
| 6,934,832 | B1* | 8/2005 | Van Dyke ........... G06F 9/30174 |
| | | | 712/244 |
| 7,065,750 | B2 | 6/2006 | Babaian et al. |
| 7,516,453 | B1 | 4/2009 | Bugnion |
| 8,327,354 | B1* | 12/2012 | Magenheimer ..... G06F 9/45554 |
| | | | 718/1 |
| 9,213,563 | B2* | 12/2015 | Jennings ............. G06F 9/45516 |
| 2005/0086650 | A1* | 4/2005 | Yates, Jr. ............ G06F 9/45533 |
| | | | 717/139 |

(Continued)

FOREIGN PATENT DOCUMENTS

WO       2017136000        8/2017

OTHER PUBLICATIONS

Gschwind, et al., "Dynamic and Transparent Binary Translation", Computer, Mar. 2000.

(Continued)

*Primary Examiner* — S. Sough
*Assistant Examiner* — Stephen D Berman
(74) *Attorney, Agent, or Firm* — Hanley, Flight & Zimmerman, LLC

(57) ABSTRACT

The present disclosure is directed to a system for on-demand binary translation state map generation. Instead of interpreting the native code to be executed, binary translation circuitry (BT circuitry) may execute a binary translation (BT) in place of the native code. When a stop occurs (e.g., due to an interrupt, a modification of the native code, etc.), the BT circuitry may generate a binary translation state map (BT state map) that allows the location of the stop to be mapped back to the native code. Generation of the BT state map may involve determining a location and offset for the stop, performing region formation based on the location, loading instructions from the region (e.g., while accounting for the need to emulate instructions), forming the BT state map based at least on the size of the loaded instructions, and then mapping the stop back to the native code utilizing the offset.

18 Claims, 5 Drawing Sheets

(56) References Cited

U.S. PATENT DOCUMENTS

| | | | |
|---|---|---|---|
| 2007/0006184 A1* | 1/2007 | Andrews | G06F 9/45516 717/136 |
| 2010/0030975 A1* | 2/2010 | Murray | G06F 8/52 711/154 |
| 2010/0153662 A1* | 6/2010 | Vick | G06F 8/52 711/154 |
| 2012/0271615 A1* | 10/2012 | North | G06F 9/45516 703/26 |
| 2014/0025893 A1* | 1/2014 | Brown | G06F 9/30174 711/125 |
| 2016/0162292 A1* | 6/2016 | Bugnion | G06F 9/45504 712/245 |
| 2016/0179546 A1 | 6/2016 | Yamada et al. | |
| 2016/0179547 A1 | 6/2016 | Yamada et al. | |
| 2018/0089468 A1 | 3/2018 | Rozas et al. | |

OTHER PUBLICATIONS

Altman, et al., "Advances and Future Challenges in Binary Translation and Optimization", Proceedings of the IEEE, vol. 89, No. 11, Nov. 2001.

Baraz et al., "IA-32 Execution Layer: a two-phase dynamic translator designed to support IA-32 applications on Itanium-based systems", proceedings of the 36th International Symposium on Microarchitecture. 2003.

\* cited by examiner

FIG. 3

Example Mapping Table 300

| Tranlation Address | Native Address | AX, CX, DI, RET |
|---|---|---|
| 0x0f789ab8 | 0x1a364f40 | --- --- --- --- |
| 0x0f789aba | 0x1a364f42 | --- X --- --- |
| 0x0f789ac0 | 0x1a364f42 | --- X --- X |
| 0x0f789ac1 | 0x1a364f42 | --- X --- X |

ON-DEMAND BINARY TRANSLATION STATE MAP GENERATION

TECHNICAL FIELD

The present disclosure relates to data processing, and more particularly, to on-demand generation of binary translation state maps to map stoppages in execution back to native code.

BACKGROUND

Binary Translation (BT) is a technique usable to achieve instruction set architecture (ISA) compatibility of a binary without recompiling, increased performance via dynamic optimization, enforcement of security policies during execution, etc. Binary translators may translate native code (e.g., programming language used by a programmer to construct a program) into a binary translation, and may execute these translations instead of the native code. Otherwise the native code would need to be interpreted (e.g., translated line-by-line during execution), which may slow down the speed of data processing. While BT increases performance, it is important for BT systems to be faithful to how the original program is designed to execute. Therefore, BT systems strive to produce the same output as the native code. Translating native code into binary may also slow down system performance, so if native code may be executed more than once it may be beneficial to store a copy of the binary translation in a translation memory or "cache" so that the binary may be executed repeatedly without having to translate the native code each time.

Maintaining translations in a translation cache is an effective technique for enhancing the performance of BT-enabled systems. However, when a thread (e.g., a sequence of programmed instructions executed by processing circuitry) executes a program, the thread understands that it is the native code being executed, and that any stops that occur during program execution will be referenced to the stop location and processor state of the native code. Examples of stops include exceptions, changes in the native code due to self-modifying or cross-modifying code, etc. Code modifications may be caused by, for example, version updates and/or corrections (e.g., patches) to the code, code obfuscation (e.g., the inclusion of needless or roundabout references in the code that may change during execution to protect the code against hacking, reverse engineering, etc.), the unpacking of code, just-in-time code compilation, etc. Thus, regardless of the performance benefits that may be realized by executing translations from a translation cache, the occurrence of a stop must still be referenceable back to a location in the native code in an expedient manner.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates an example binary translation state map in accordance with at least one embodiment of the present disclosure;

Figure 1:
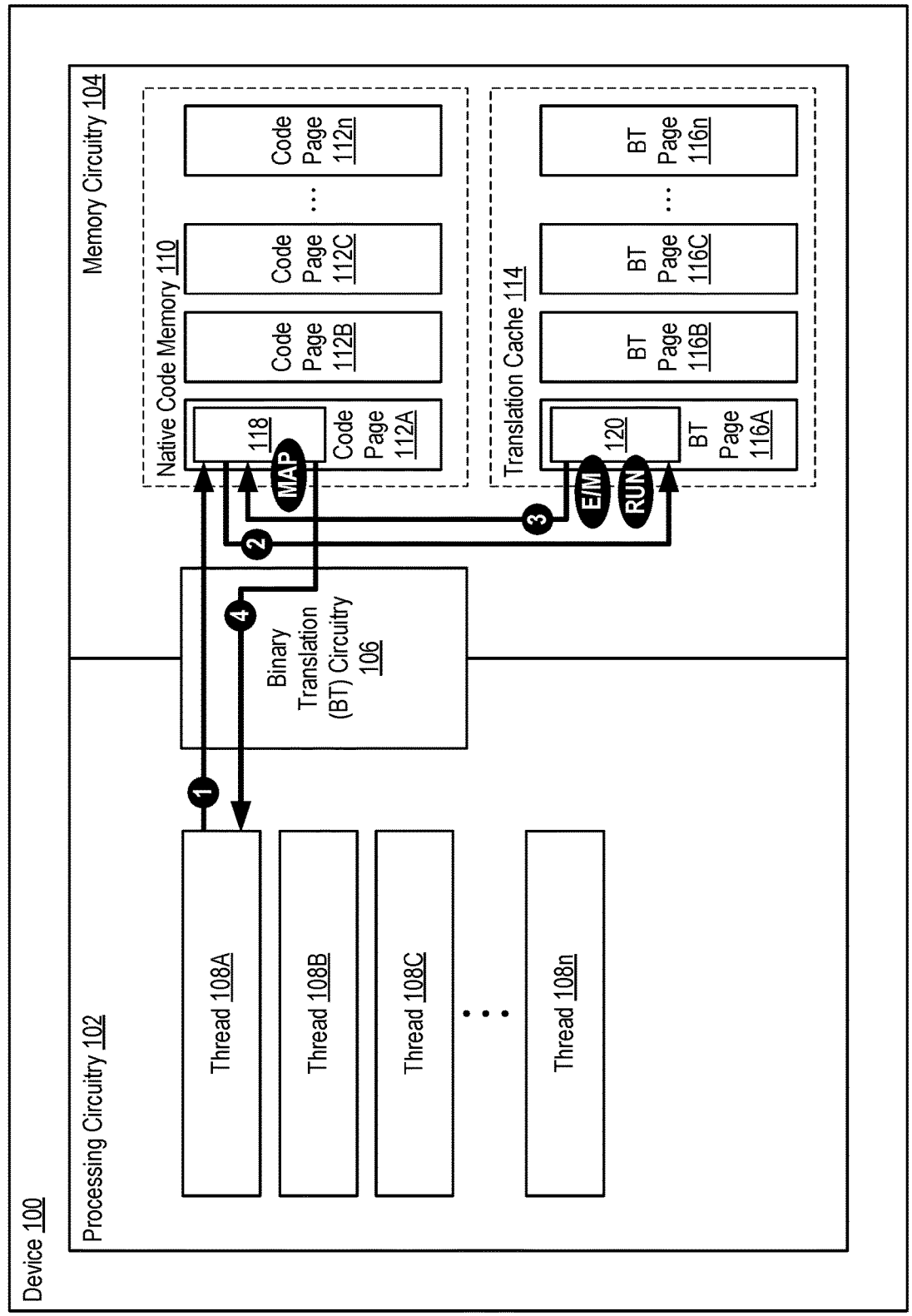
FIG. 1 illustrates an example device comprising a system for on-demand binary translation state map generation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a system for on-demand binary translation state map generation. A thread executed by processing circuitry in a device may in turn attempt to execute a section of native code. Instead of interpreting the native code to be executed, binary translation circuitry (BT circuitry) in the device may execute a binary translation (BT) in place of the native code. The BT may be retrieved from a translation cache, or if a copy of the BT does not already exist in the translation cache, the BT may be generated from the native code. On the occurrence of a stop (e.g., due to an interrupt, a modification of the native code, etc.), the BT circuitry may proceed to generate a binary translation state map (BT state map) that allows the location of the stop to be mapped back to the native code (e.g., in the form of a native instruction address and register context state). Generation of the BT state map may involve determining a location and offset for the stop, performing region formation based on the location, loading instructions from the region (e.g., while accounting for the need to emulate instructions), forming the BT state map based at least on the size of the loaded instructions, and then mapping the stop back to the native code utilizing the offset. BT state map generation may not result in binary code being generated from the native code instructions. Following the mapping the BT state map may then be deleted.

In at least one embodiment, an example device including on-demand binary translation state map generation may comprise at least memory circuitry, processing circuity and binary translation circuitry. The memory circuitry may include a native code memory to store sections of native code and a translation cache to store binary translations corresponding to the sections of native code. The processing circuitry may be to execute at least one thread. The binary translation circuitry may be to execute a binary translation, determine that a stop has occurred during binary translation execution and generate a binary translation state map of at least a portion of the binary translation.

In at least one embodiment, the binary translation circuitry may also be to determine that the at least one thread is attempting to execute a section of native code, determine if a binary translation corresponding to the native code already exists in the translation cache and generate a binary translation of the section of native code when it is determined that a corresponding binary translation does not already exist in the translation cache. The binary translation circuitry may also be to store a start address of the section of native code and a region formation strategy used to generate the binary translation. The binary translation circuitry may also be to generate the binary translation state map utilizing the start address and the region formation strategy.

In at least one embodiment, the stop may be caused by the binary translation circuitry determining that an exception or a code modification in a section of native code has occurred. The determination that a code modification has occurred may cause the binary translation circuitry to determine if the code modification affects the binary translation being executed. In generating the binary translation state map, the binary translation circuitry may be to determine a stop location and offset in the binary translation, form a region from the native code based at least on the stop location, load instructions from the region, determine the binary translation state map based at least on the size of the loaded instructions and map to a location in a section of the native code by applying the offset to the binary translation state map. The binary translation circuitry may not translate each loaded instruction into binary code when generating the binary translation state map. In loading each instruction, the binary translation circuitry may be to determine whether each instruction to be loaded requires emulation, load the instruction when it is determined that emulation is not required and generate one or more secondary instructions to emulate the instruction when it is determined that emulation is required.

In at least one embodiment, the binary translation circuitry may be to map the occurrence of the stop in the binary translation to a native instruction address and a register context state using the binary translation state map. The binary translation circuitry may be to provide the native instruction address and the register context state to the at least one thread and delete the binary translation state map. Consistent with the present disclosure, a method for on-demand binary translation state map generation may comprise executing, utilizing binary translation circuitry in a device, a binary translation corresponding to a section of native code, determining that a stop has occurred during binary translation execution and generating a binary translation state map of at least a portion of the binary translation.

FIG. 1 illustrates an example device comprising a system on-demand binary translation state map generation in accordance with at least one embodiment of the present disclosure. The following disclosure may make reference to, or may use terminology commonly associated with, certain technologies to, for example, perform binary translation of native code. These references are utilized herein merely for the sake of explanation, and are not intended to limit embodiments consistent with the present disclosure to any particular manner of implementation. While these examples may provide a basis for understanding the embodiments, actual implementations may employ other technologies existing now or developed in the future. Moreover, the inclusion of an apostrophe after an item number (e.g., 100') in the present disclosure may indicate that an example embodiment of the particular item is being illustrated. These illustrated examples are also not intended to limit the various embodiments to any particular manner of implementation. As referenced herein, a "stop" may be any event in the execution of a program that causes the program to pause execution. Examples of stops may include, but are not limited to, interrupts generated by hardware or software, a determination that the native code has been modified, etc. As referenced herein, "BT system" may comprise hardware, software and combinations thereof to at least perform binary translation of native code and various related operations, and may be referenced interchangeably with the terminology "BT circuitry" in the following disclosure.

In general, upon execution of a program a BT system in a device may initially check for an existing BT in a translation cache, generate a new BT from the native code if it is determined that the BT doesn't already exist and then execute the BT in lieu of the native code. However, programmatic stops (e.g., exceptions) may occur during the execution of a program for various reasons. Most programming languages provide language constructs so that exceptions may be handled gracefully and the program may be recovered from the exception. To allow exceptions to be handled gracefully while preserving compatibility with the native application, BT systems must give the illusion that exceptions are being generated from the native code, not from the BT.

An exception context is typically required to handle or report exceptions correctly. The exception context may comprise the address of the instruction that caused the exception and an execution state for the program including, for example, the register context state. However, as BT systems execute BTs in different memory locations from native code locations, the address of the faulting instruction may fall inside the BT. The resulting register context state of the BT may not correspond exactly with the context that would be expected from the native code as the register mapping between the host and target may not be the same in BT Systems.

To reconstruct the exception context of the native code upon the occurrence of a stop, BT systems generate a BT state map table when each translation is generated, the BT state map table being stored along with the BT. The BT state map is used to reconstruct the faulting instruction pointer and the register context state of the original binary upon exception. The faulting address of the translated binary needs to be mapped to the native instruction address because the stop has to be handled by the program, which may not be aware of the BT system and has no knowledge of the BT being executed. Therefore, the native instruction address and the register context state have to be recovered using the state map. Moreover, internal stops such as Self-Modifying Code (SMC) exceptions require BT systems to generate a new BT from the modified native code at the point where the exception occurred. The mapping between the native code and the BT must be maintained because the program must be resumed after the internal exception has been handled.

Converting a BT address to a native address requires a mapping between the two sets of addresses. Reconstructing a register context state for a native address requires information that establishes how the register context state of the native code for a corresponding BT address may be located. As stops may be triggered any time, existing BT systems have been required to store the state map table along with the BT. However, the space required to store the BT state map is not negligible. It has been observed that the BT state map often takes up space more than the BT itself. Due to limitations regarding how much of memory may reasonably be allocated for BT systems without creating the memory footprint bloat issues, a bigger memory demand for the BT state map table results in smaller memory allocation for the BT. This limitation may increase the frequency of garbage collection (e.g., memory management wherein unused data may be deleted to free up memory), retranslation of the native code, etc. that may negatively impact BT system performance.

Consistent with the present disclosure, a system for on-demand BT state map generation is disclosed. This system does not require BT state maps to be stored along with the BTs in the translation cache memory, and may significantly increase memory allocation (e.g., availability) for actual BTs. The on-demand BT state map generation system may take advantage of the fact that binary translation is a deterministic operation for a given input, and thus mappings may be generated on-demand from native code using a sequence of operations similar to BT generation.

Referring to FIG. 1, device 100 may be any apparatus comprising resources configurable to at least receive a data input, process the data and generate an output. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Example device 100 may comprise processing circuitry 102, memory circuitry 104 and BT circuitry 106. Example implementations of processing circuitry 102, memory circuitry 104 and BT circuitry 106, as well as other circuitry that may exist in device 100, will be disclosed in in regard to FIG. 2. In general, processing circuitry 102 may execute thread 108A, thread 108B, thread 108C . . . thread 108n (collectively, "threads 108A . . . n"). Threads 108A . . . n, as referenced herein, may be made up of sequences of programmatic instructions that may interact with various resources in device 100 such as memory circuitry 104. In this regard, threads 108A . . . n may access data that is stored in memory circuitry 104. At least one thread (e.g., 108A) may be launched in processing circuitry 102 when, for example, device 100 is initiated, program execution is triggered, etc. In at least one example scenario, a user of device 100 may cause an application to be loaded in device 100.

Memory circuitry 104 may comprise native code memory 110 and translation cache 114. Native code memory 110 and translation cache 114 may reside in a single physical memory or in separate physical memories that may be configured to store data temporarily while device 100 is active. In at least one embodiment, native code memory 110 may comprise at least one memory page, and in example illustrated in FIG. 1 comprises at least code page 112A, code page 112B, code page 112C . . . code page 112n (collectively, "code pages 112A . . . n"). Code pages 112A . . . n may comprise at least sections of native code that may, alone or in combination, form the basis for various software in device 100 such as, for example, OS components, applications, programs, services, utilities, drivers, etc. In the same or a different embodiment, translation cache 114 may include at least one memory page (e.g., BT page), and in the example shown in FIG. 1 includes at least BT page 116A, BT page 116B, BT page 116C . . . BT page 116n (collectively, "BT pages 116A . . . n). BT pages 116A . . . n may comprise binary translations corresponding to native code in code pages 112A . . . n. For example, as shown in FIG. 1 native code 118 in code page 112A may have a corresponding BT 120 in BT page 116A.

BT circuitry 106 may generally comprise software, hardware or combinations thereof to perform binary translation and related operations such as, for example, the generation of BT state maps. Consistent with the present disclosure, BT state maps may be generated as required. If a stop occurs, a BT state map may be generated for use in mapping where the stop occurred in BT 120 to a corresponding location in native code 118. The BT state map may then be discarded as soon as the exception is handled. There is no requirement to retain mapping data. This approach may effectively double the amount of BTs that may be simultaneously stored in translation cache 114 without increasing the overall memory footprint of the BT system. The significant decrease in memory required to store each BT (e.g., due to the reduced cost of storing translation metadata without a BT state map table) may result in an overall performance increase of the BT system, an increase in the speed of execution of programs in device 100 and in overall device performance.

FIG. 1 illustrates an example of operation wherein thread 108A is attempting to execute at least native code section 118 as shown at ①. BT circuitry 106 may intervene in the attempted execution and may instead query for a BT corresponding to native code section 118 as shown at ②. If BT circuitry 106 determines that there is no corresponding BT existing translation cache 114, then a new BT may be generated from native code 118. Otherwise, if BT 120 exists (e.g., as shown in FIG. 1), then BT circuitry 106 may execute (RUN) BT 120. If during execution a stop occurs such as an exception or determination that native code 118 has been modified (E/M), then BT circuitry 106 may generate a BT state map (MAP) as shown at ③. Examples of a BT state map and how a BT state map may be generated will be discussed in detail in regard to FIGS. 3-5. Consistent with the present disclosure, the BT state map (MAP) may allow BT circuitry 106 to map the location of the stop (E/M) from BT 120 back to native code 118. Data pertaining to the stop (e.g., native instruction address and register context state) may then be provided back to thread 108A as shown at ④ so that, for example, the stop may be resolved. Following resolution of the stop, the execution of the program may continue from the point where the stop occurred.

Figure 2:
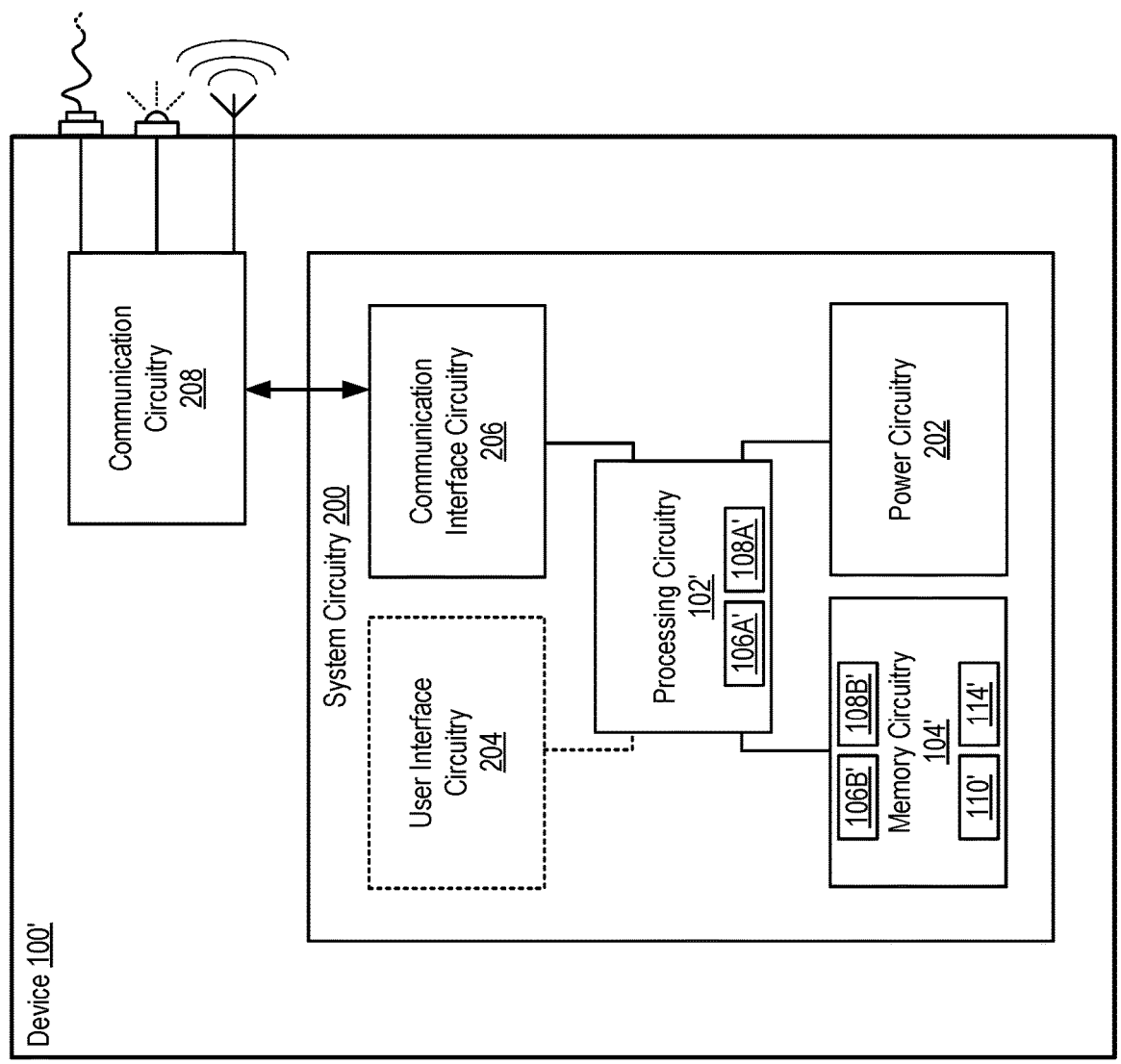
FIG. 2 illustrates an example configuration for a device usable in accordance with at least one embodiment of the present disclosure.

FIG. 2 illustrates an example configuration for a system usable in accordance with at least one embodiment of the present disclosure. Device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation.

In the illustrated example configuration, device 100' may comprise system circuitry 200 to manage general operations. System circuitry 200 may include processing circuitry 102', memory circuitry 104', power circuitry 202, user interface circuitry 204 and communication interface circuitry 206. Device 100' may further include communication circuitry 208. While communication circuitry 208 is illustrated as separate from system circuitry 200, this example configuration is shown merely for the sake of explanation. Some or all of the functionality associated with communication circuitry 208 may also be incorporated into system circuitry 200.

In device 100', processing circuitry 102' may comprise one or more processors situated in separate components, or alternatively one or more processing cores in a single component (e.g., in a system-on-chip (SoC) configuration), along with processor-related support circuitry (e.g., bridging interfaces, etc.). Example processors may include, but are not limited to, various x86-based microprocessors from the Intel Corporation including those in the Pentium®, Xeon®, Itanium®, Celeron®, Intel Atom®, Quark®, Core i-series and Core M-series product families, Advanced RISC (e.g., Reduced Instruction Set Computing) Machine or "ARM" processors, etc. Examples of support circuitry may include various chipsets (e.g., Northbridge, Southbridge, etc. from the Intel Corporation) configured to provide an interface through which processing circuitry 102' may interact with other system components that may be operating at different speeds, on different buses, etc. in device 100'. Moreover, some or all of the functionality associated with the support circuitry may be included in the same physical package as the processor (e.g., such as in the Sandy Bridge, Broadwell and Skylake families of processors from the Intel Corporation).

Processing circuitry 102' may be configured to execute various instructions in device 100'. Instructions may include program code configured to cause processing circuitry 102' to perform activities related to reading data, writing data, processing data, formulating data, converting data, transforming data, etc. Information (e.g., instructions, data, etc.) may be stored in memory circuitry 104'. Memory circuitry 104' may comprise random access memory (RAM) and/or read-only memory (ROM) in a fixed or removable format. RAM may include volatile memory configured to hold information during the operation of device 100' such as, for example, static RAM (SRAM) or dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, example magnetic memories such as hard disk (HD) drives, etc., example electronic memories such as solid state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Power circuitry 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. User interface circuitry 204 may be optional in certain circumstances such as, for example, a situation wherein device 100' is a very small form factor device configured remotely (e.g., wirelessly) by another device, a server (e.g., rack server, blade server, etc.) that does not include user interface circuitry 204, and instead relies on another device (e.g., a management terminal) for user interface functionality, etc.

Communication interface circuitry 206 may be configured to manage packet routing and other control functions for communication circuitry 208 that may include resources configured to support wired and/or wireless communications. In some instances, device 100' may comprise more than one set of communication circuitry 208 (e.g., including separate physical interface circuitry for wired protocols and/or wireless radios) managed by communication interface circuitry 206. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 206 may be configured to prevent wireless communications that are active in communication circuitry 208 from interfering with each other. In performing this function, communication interface circuitry 206 may schedule activities for communication circuitry 208 based on, for example, the relative priority of messages awaiting transmission. While the embodiment disclosed in FIG. 2 illustrates communication interface circuitry 206 being separate from communication circuitry 208, it may also be possible for the functionality of communication interface circuitry 206 and communication circuitry 208 to be incorporated into the same circuitry.

Consistent with the present disclosure, BT circuitry 106' may include hardware, software or combinations thereof. In an example hardware implementation BT circuitry 106 may include a standalone integrated circuit or be a part of other circuitry (e.g., processing circuitry 102'). In an example combined software/hardware implementation, at least a portion of BT circuitry 106' may reside in processing circuitry 102' and/or memory circuitry 104'. For example, BT circuitry 106A' may comprise code executed by processing circuitry 102', wherein at least a portion of the code may be stored in memory circuitry 104' as shown at 106B'. Processing circuitry 102' may execute the code 106B' to transform processing circuitry 102' from general purpose data processing circuitry into specialized circuitry to perform at least the functions associated with BT circuitry 106A'. Native code memory 110' and/or translation cache 114' may reside in memory circuitry 104' (e.g., in a volatile memory like RAM that may lose its contents when device 100' is powered down, rebooted, etc.). In an example of operation, thread 108A' being executed by processing circuitry 102' may attempt to execute native code 119 stored in native code memory 110', but BT circuitry 106A' may instead load (or generate) BT 120 stored within translation cache 114'. Upon the occurrence of a stop, BT circuitry 106A' may generate a BT state map for mapping the location where the stop occurred in BT 120 back to native code 118. BT circuitry 106A' may provide stop-related information to thread 108A' for resolving the stop.

FIG. 3 illustrates an example binary translation state map in accordance with at least one embodiment of the present disclosure. Traditionally, translation metadata is generated when BT 120 is generated from bytes of native code 118 and stored with BT 120 throughout its lifetime. Translation metadata may include entries to map each translation address to a native address. An example mapping table 300 is illustrated in FIG. 3. For instructions with a one-to-one mapping, an entry exists for each <translation address, native address> pair that may be augmented with a bitmap for restore operations. For example, in table 300 an instruction at address 0x1a364f40 is mapped to a translated binary instruction at address 0x0f789ab8. Some native instructions (e.g., CALL and RETURN) may require emulation in the BT system. Emulation may be utilized when a single instruction in native code 118 does not map directly to a corresponding instruction in BT 120. These instructions usually expand to several binary code instructions during translation. In such instances, a range of addresses in BT 120 may map to a single native address in native code 118. The translation metadata may then comprise multiple entries with the same 'native address' field. Native instruction at 0x1a364f42 in table 300 is an example of such an instruction.

When emulating special instructions such as CALL and RET, binary circuitry 106 may perform additional tasks to maintain an execution environment that is consistent with the native execution environment. For example, additional registers may be employed to preserve original values. BT circuitry 106 may back up the original values in a "scratch area" and then restore them when the emulation is complete. As a result, some native values may have to be recovered from the scratch area. State map table may also be responsible for keeping track of the original values that should be restored from the scratch area using the aforementioned bitmap augmented to each entry. Example bitmaps may comprise bit flags corresponding to each of an accumulator register (AX, 16-bit), counter register (CX, 16-bit), destination index for string operations (DI, 16-bit) and return field (RET). Bit values for AX, CX, and DI may indicate whether EAX (32-bit)/RAX (64-bit), ECX (32-bit)/RCX (64-bit) or EDI (32-bit)/RDI (64-bit) register values are backed up in the scratch area when the associated translated instruction is executed. The RET field of the bitmap indicates whether the return address has already been pushed onto the stack during the emulation of a CALL operation during which the BT system has to explicitly store native return addresses on the stack for consistency with the native execution. For example, in table 300 the bit flags indicate that the translated instruction at 0x0f789ab8 does not store any values in the memory. The instruction at 0x0f789aba stores a CX register value in the scratch area. An operation is carried out at 0x0f789ac0 to store the native return address on the stack. Instruction at 0x0f789ac1 does not store values to the scratch area, and thus it does not modify the bitmap.

In table 300 second native instruction (0x1a364f42) is expanded into several translated instructions. As one <translation address, native address> pair and its associated bitmap have to be stored for each translated instruction, table 300 usually takes much more space than the actual BT 120 if it is not compressed. For example, for a 32-bit architecture translation metadata may be double the size of the native code as each mapping entry. This occurs because each mapping entry may take more than 8 bytes whereas average instruction size may be less than 4 bytes. To save memory space, some BT systems may choose to compress state map table 300. Even with this optimization, a typical state map table consumes about the same amount of memory space as the corresponding BT 120 does for the lifetime of BT 120.

In at least one embodiment, the on-demand creation of state map table may be an almost identical process to translation generation except that some stages of binary translation may be skipped such as, for example, the actual translation of native instructions into binary. Given a native instruction address (e.g., a first instruction corresponding to a section of native code 118 used to generate BT 120), first a region formation process takes place where sets of instructions are identified for a translation region. In region formation the addition of an instruction to the region may be followed by adding the next instruction to the region as well. If region formation encounters a control flow instruction (e.g., JMP, CALL, RET, etc.) whether or not the targets of the control flow instruction are added to the region may depend on the translation strategy. The region is finalized when enough instructions or blocks of code are added to the region or when there are no more blocks to add.

Following region formation, BT circuitry 106 would typically perform code generation, along with any necessary code optimization, into a translation buffer. However, in on-demand BT state map generation code generation may be omitted. Instead of generating BT 120, the state map table may be populated only with metadata. For example, native addresses may be recorded and information about how the native register context may be restored for a translated code instruction pointer (IP) may be updated. As exception handling only requires a state map table entry for the given exception address, there is no need to create a state map table for the entire translation. Therefore, the process of creating the state map table may be discontinued once the metadata for the translated instruction at the exception address is generated.

In general, BT state map table generation is deterministic when the input parameters for the translation do not change (e.g., including the starting IP, the translation strategy used and the native code bytes in memory). However, existing BT systems do not guarantee that native code 118 has not changed. For example, Self- or Cross-Modifying Code (SMC/XMC) may overwrite native code memory at any time. To account for this scenario, the SMC and XMC behaviors of native code 118 may first be determined. In some circumstances SMC and XMC events may be intercepted and a BT state map may be generated before the code modification in the SMC or XMC actually occurs. For example, whenever the permissions of a non-writable native code page 112A . . . n is changed to writable (e.g., a typical trigger for SMC/XMC detection), it is possible that all translations that originated from the native code page 112A . . . n may become stale. In response to a determination of a code change, possibly affected translations (e.g., stale translations) may be identified and invalidated. Invalidation may comprise altering BTs 120 affected by the code modification (e.g., via flagging, page permission changes, etc.) to prevent the stale BTs 120 from being executed. The stale BTs 120 may eventually be replaced by new BTs that are generated from modified native code 120.

On rare occasions, certain translations may repeatedly exhibit SMC/XMC behaviors in that native code pages 112A . . . n from which BTs 120 originate are repeatedly modified. In this scenario, the BT system may instead create a self-checking translation that, for example, verifies the validity of native code 118 before executing the corresponding BT 120 to avoid the overhead due to SMC/XMC detection.

Thus, the SMC/XMC detection mechanism may be disabled when self-checking translations are employed. Our system makes an exception for these rare cases and it may generate and store the state map table along with the self-checking translation.

Figure 4:
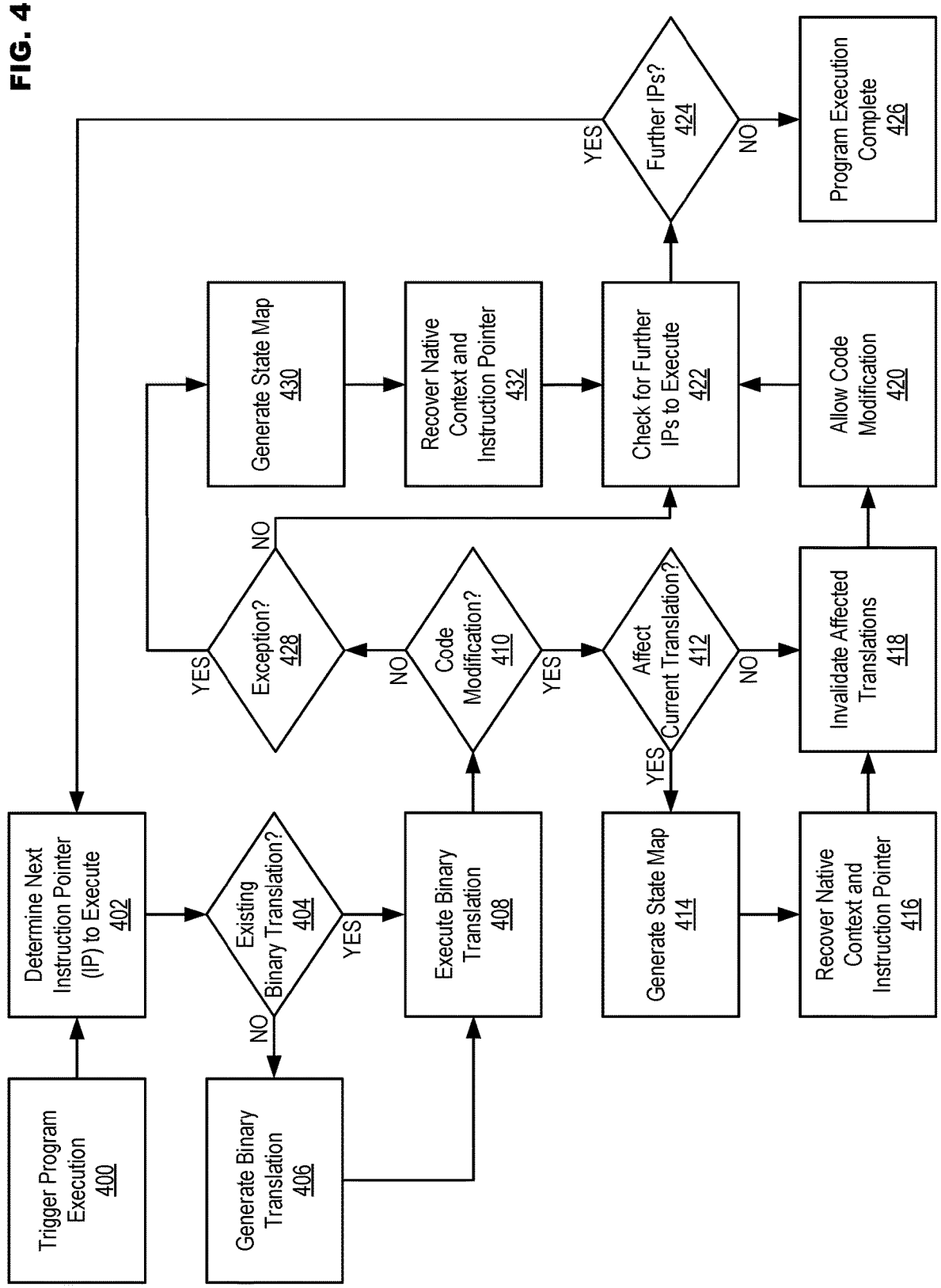
FIG. 4 illustrates example operations for determining when to generate binary translation state maps in accordance with at least one embodiment of the present disclosure.

FIG. 4 illustrates example operations for determining when to generate binary translation state maps in accordance with at least one embodiment of the present disclosure. In at least one embodiment, operations 400 to 432 may be performed by BT circuitry in a device. In operation 400 program execution may be triggered. Program execution may be triggered in the device due to processing circuitry executing a thread that attempts to execute native code. Certain activities may cause a thread to attempt to execute the native code such as, for example, device activation, an automated event or manual event (e.g., due to user interaction with the device) that causes a program to be launched, etc. The next instruction pointer (IP) to execute in the program may be determined in operation 402. A determination may then be made in operation 404 as to whether a BT corresponding to the native code to execute already exists (e.g., in a translation cache in the device). If in operation 404 it is determined that a BT does not already exist, then in operation 406 the BT circuitry may generate a BT. A determination that a BT already exists in operation 404 or operation 406 may then be followed by operation 408 wherein the BT is executed.

During execution of the BT a determination may be made in operation 410 as to whether a code modification has occurred in the native code. A code modification may be determined based on, for example, a detected change in permissions for the native code page in which the native code resides. If in operation 410 it is determined that a code modification has occurred, then in operation 412 a further determination may be made as to whether the code modification affects the current BT being executed. If in operation 412 it is determined that the current BT is affected, then in operation 414 a BT state map may be generated. The native context and IP may then be recovered in operation 416, and in operation 418 any BTs determined to be affected by the code modification, including some or all of the current BT, may be invalidated. On the other hand, if in operation 412 the current BT is determined not to be affected by the modification to the native code, then any other BTs determined to be affected by the code modification may be invalidated in operation 418. Implementation of the modifications to the native code may then be allowed in operation 420. In operation 422 a check for further IPs to execute may occur. A determination may then be made in operation 424 as to whether there are further IPs to execute based on the check performed in operation 422. If in operation 424 it is determined that there are no further IPs to execute, then in operation 426 program execution is complete. Otherwise, a determination that there are further IPs to execute may be followed by a return to operation 402.

Returning to operation 410, a determination that there has not been a code modification may be followed by operation 428 wherein a further determination is made as to whether an exception has occurred. An exception may be generated by hardware, by software (e.g., from within the program), etc. A determination that an exception has not occurred may be followed by a return to operation 422 to check for further IPs to execute. If it is determined in operation 428 that an exception has occurred, then in operation 430 a BT state map may be generated. In operation 432 the native context and instruction pointer may be recovered. Operation 432 may be followed by a return to operation 422 to check for further IPs to execute. Consistent with the present disclosure, the native context and instruction pointer may be provided to the thread that launched the program for use in resolving the situation that triggered the exception. Following resolution of the situation, the program may resume from the point where the exception occurred.

Figure 5:
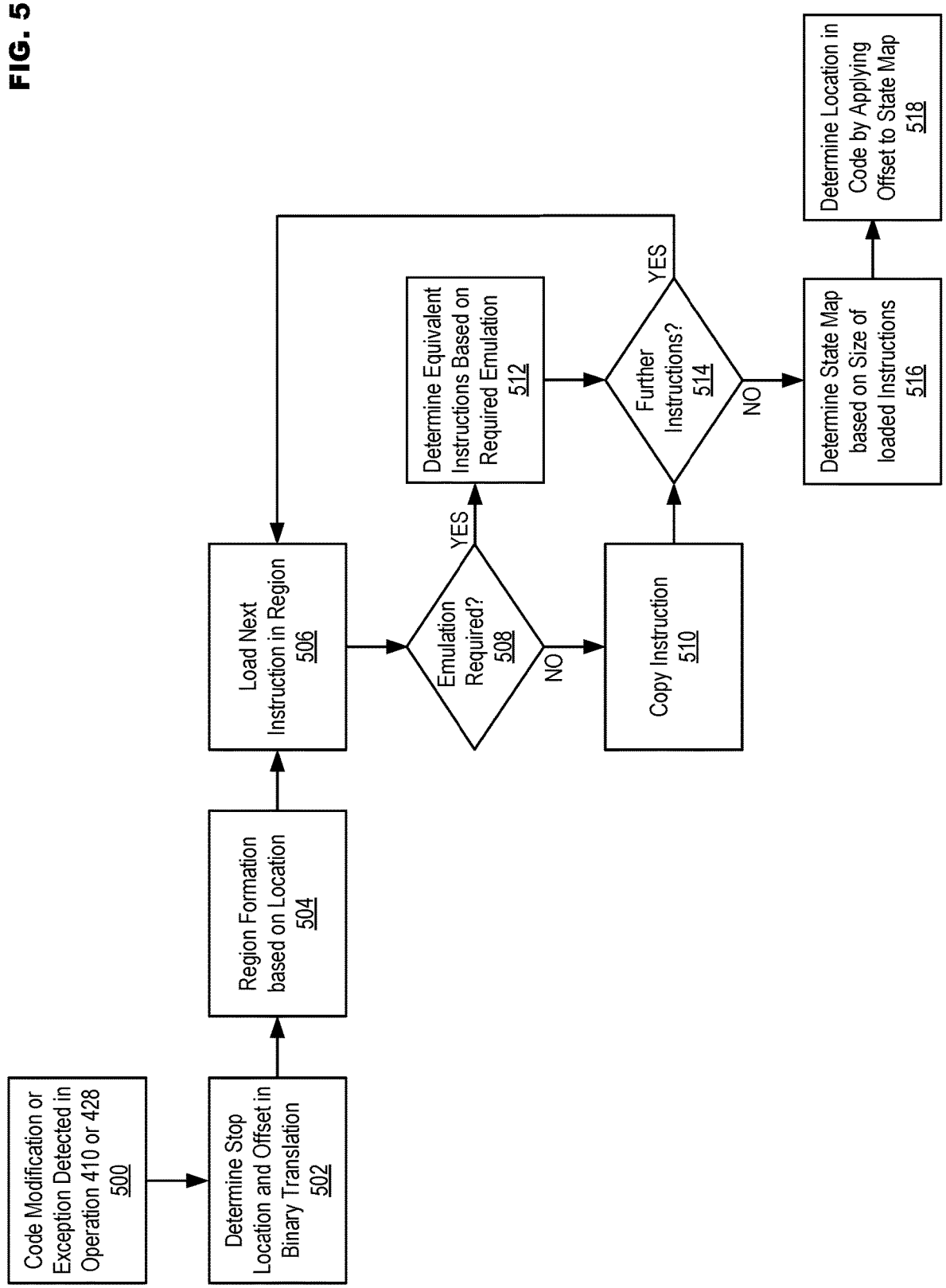
FIG. 5 illustrates example operations for binary translation state map generation in accordance with at least one embodiment of the present disclosure.

FIG. 5 illustrates example operations for binary translation state map generation in accordance with at least one embodiment of the present disclosure. The operations illustrated in FIG. 5 may initiate in operation 500 with a code modification or exception being detected in one of operations 410 or 428 as shown in FIG. 4. A stop location and offset relative to the BT may be determined in operation 502. The stop location may indicate a section of code where the stop occurred, while the offset may indicate a location for (e.g., the offset of) the actual instruction within the section of code that caused the stop. In operation 504 region formation may take place based on the stop location.

In operation 506 the next instruction may be loaded from the region of native code that was determined in operation 504. A determination may be made in operation 508 as to whether emulation is required for the instruction loaded in operation 506. Emulation may be required when there is not a binary instruction that directly corresponds to the instruction in native code. A determination in operation 508 that no emulation is required may be followed by operation 510 wherein the instruction is copied to the state map. Otherwise, if in operation 508 it is determined that emulation of the loaded instruction is required, then in operation 512 a group of individual binary instructions that when executed operate equivalently to the native instruction may be determined. A determination in operation 514 that there are further instructions to load may be followed by a return to operation 506. Otherwise, in operation 516 a size of the state BT map may be determined based on the loaded instructions, and in operation 518 the offset may be applied to the BT state map to determine a mapping from the binary code instruction that caused the stop back to the corresponding instruction in the native code. For example, a size of the state map may be established by a total number of bytes of code for the loaded instructions, and the offset may indicate the location of the instruction in the BT based on a number of bytes from the beginning of the code section. The mapping may then use the offset to determine the instruction that occurs at that byte offset, which maps back to an instruction in the native code. On-demand BT state mapping may be both fast and resource-conscious in that there is no need to generate a BT state map larger than the stop location and offset define. For example, the stop location and offset may define a section of the BT to map that is only a small part of the entire section of code being executed. The size of the resulting on-demand BT state map may be substantially smaller than the size of a state map covering the entire section of code. This may result in faster BT state map generation with reduced processing overhead that may improve overall device performance.

While FIGS. 4 and 5 illustrates operations according to different embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to a system for on-demand binary translation state map generation. Instead of interpreting the native code to be executed, binary translation circuitry (BT circuitry) may execute a binary translation (BT) in place of the native code. When a stop occurs (e.g., due to an interrupt, a modification of the native code, etc.), the BT circuitry may generate a binary translation state map (BT state map) that allows the location of the stop to be mapped back to the native code. Generation of the BT state map may involve determining a location and offset for the stop, performing region formation based on the location, loading instructions from the region (e.g., while accounting for the need to emulate instructions), forming the BT state map based at least on the size of the loaded instructions, and then mapping the stop back to the native code utilizing the offset.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for on-demand binary translation state map generation.

According to example 1 there is provided a device including on-demand binary translation state map generation. The device may comprise memory circuitry including a native code memory to store sections of native code and a translation cache to store binary translations corresponding to the sections of native code, processing circuitry to execute at least one thread and binary translation circuitry to execute a binary translation, determine that a stop has occurred during binary translation execution and generate a binary translation state map of at least a portion of the binary translation.

Example 2 may include the elements of example 1, wherein the binary translation circuitry is to determine that the at least one thread is attempting to execute a section of native code, determine if a binary translation corresponding to the native code already exists in the translation cache and generate a binary translation of the section of native code when it is determined that a corresponding binary translation does not already exist in the translation cache.

Example 3 may include the elements of example 2, wherein the binary translation circuitry is to store a start address of the section of native code and a region formation strategy used to generate the binary translation.

Example 4 may include the elements of example 3, wherein the binary translation circuitry is to generate the binary translation state map utilizing the start address and the region formation strategy.

Example 5 may include the elements of any of examples 2 to 3, wherein the binary translation circuitry is to store a start address of the section of native code and a region formation strategy used to generate the binary translation and generate the binary translation state map utilizing the start address and the region formation strategy.

Example 6 may include the elements of any of examples 1 to 5, wherein the stop is caused by the binary translation circuitry determining that an exception or a code modification in a section of native code has occurred.

Example 7 may include the elements of example 6, wherein the determination that a code modification has occurred causes the binary translation circuitry to determine if the code modification affects the binary translation being executed.

Example 8 may include the elements of any of examples 1 to 7, wherein the stop is caused by the binary translation circuitry determining that an exception or a code modification in a section of native code has occurred, and if a code modification is determined to have occurred, the binary translation circuitry is further to determine if the code modification affects the binary translation being executed.

Example 9 may include the elements of any of examples 1 to 8, wherein in generating the binary translation state map the binary translation circuitry is to determine a stop location and offset in the binary translation, form a region from the native code based at least on the stop location, load instructions from the region, determine the binary translation state map based at least on the size of the loaded instructions and map to a location in a section of the native code by applying the offset to the binary translation state map.

Example 10 may include the elements of example 9, wherein the binary translation circuitry does not translate each loaded instruction into binary code when generating the binary translation state map.

Example 11 may include the elements of any of examples 9 to 10, wherein in loading each instruction the binary translation circuitry is to determine whether each instruction to be loaded requires emulation, load the instruction when it is determined that emulation is not required and generate one or more secondary instructions to emulate the instruction when it is determined that emulation is required.

Example 12 may include the elements of any of examples 1 to 11, wherein the binary translation circuitry is to map the occurrence of the stop in the binary translation to a native instruction address and a register context state using the binary translation state map.

Example 13 may include the elements of example 12, wherein the binary translation circuitry is to provide the native instruction address and the register context state to the at least one thread and delete the binary translation state map.

Example 14 may include the elements of any of examples 1 to 13, wherein the binary translation circuitry is to map the occurrence of the stop in the binary translation to a native instruction address and a register context state using the binary translation state map, provide the native instruction address and the register context state to the at least one thread and delete the binary translation state map.

Example 15 may include the elements of any of examples 1 to 14, wherein the code memory is to store at least memory pages including the sections of code and the translation cache is to store at least memory pages including binary translations corresponding to the sections of code.

Example 16 may include the elements of any of examples 1 to 15, wherein the binary circuitry is implemented in hardware.

Example 17 may include the elements of any of examples 1 to 16, wherein the binary circuitry is implemented utilizing a combination of hardware and software.

Example 18 may include the elements of example 17, wherein the combination of hardware and software comprises at least the processing circuitry executing code including instructions to transform the processing circuitry into specialized circuitry to perform operations related to the binary translation circuitry.

According to example 19 there is provided a method for on-demand binary translation state map generation. The method may comprise executing, utilizing binary translation circuitry in a device, a binary translation corresponding to a section of native code, determining that a stop has occurred during binary translation execution and generating a binary translation state map of at least a portion of the binary translation.

Example 20 may include the elements of example 19, and may further comprise determining that at least one thread executed by processing circuitry in the device is attempting to execute a section of the native code, determining if a binary translation corresponding to the native code already exists in the device, generating a binary translation of the section of native code when it is determined that a corresponding binary translation does not already exist in the device and storing a start address of the section of native code and a region formation strategy used to generate the binary translation, wherein the binary translation state map is generated utilizing the start address and the region formation strategy.

Example 21 may include the elements of any of examples 19 to 20, and may further comprise determining whether the stop was caused by an exception or a code modification in a section of native code and, when a code modification is determined to have occurred, further determining if the code modification affects the binary translation being executed.

Example 22 may include the elements of example 21, and may further comprise invalidating binary translations determined to be affected by the code modification.

Example 23 may include the elements of any of examples 19 to 22, wherein generating the binary translation state map comprises determining a stop location and offset in the binary translation, forming a region from the native code based at least on the stop location, loading instructions from the region, determining the binary translation state map based at least on the size of the loaded instructions and mapping to a location in a section of the native code by applying the offset to the binary translation state map.

Example 24 may include the elements of example 23, wherein loading instructions from the region comprises determining whether each instruction to be loaded requires emulation, loading the instruction when it is determined that emulation is not required and generating one or more secondary instructions to emulate the instruction when it is determined that emulation is required.

Example 25 may include the elements of any of examples 19 to 24, and may further comprise mapping the occurrence of the stop in the binary translation to a native instruction address and a register context state using the binary translation state map.

Example 26 may include the elements of example 25, and may further comprise providing the native instruction address and the register context state to at least one thread executed by processing circuitry in the device and deleting the binary translation state map.

Example 27 may include the elements of any of examples 19 to 26, and may further comprise mapping the occurrence of the stop in the binary translation to a native instruction address and a register context state using the binary translation state map, providing the native instruction address and the register context state to at least one thread executed by processing circuitry in the device and deleting the binary translation state map.

According to example 28 there is provided a system for on-demand binary translation state map generation including at least one device, the system being arranged to perform the method of any of the above examples 19 to 27.

According to example 29 there is provided a chipset arranged to perform the method of any of the above examples 19 to 27.

According to example 30 there is provided at least one machine readable medium comprising a plurality of instructions that, in response to be being executed on a computing device, cause the computing device to carry out the method according to any of the above examples 19 to 27.

According to example 31 there is provided at least one device configured for on-demand binary translation state map generation, the at least one device being arranged to perform the method of any of the above examples 19 to 27.

According to example 32 there is provided a system for on-demand binary translation state map. The system may comprise means for executing, utilizing binary translation circuitry in a device, a binary translation corresponding to a section of native code, means for determining that a stop has occurred during binary translation execution and means for generating a binary translation state map of at least a portion of the binary translation.

Example 33 may include the elements of example 32, and may further comprise means for determining that at least one thread executed by processing circuitry in the device is attempting to execute a section of native code, means for determining if a binary translation corresponding to the native code already exists in the device, means for generating a binary translation of the section of native code when it is determined that a corresponding binary translation does not already exist in the device and means for storing a start address of the section of native code and a region formation strategy used to generate the binary translation, wherein the binary translation state map is generated utilizing the start address and the region formation strategy.

Example 34 may include the elements of any of examples 32 to 33, and may further comprise means for determining whether the stop was caused by an exception or a code modification in a section of native code and means for, when a code modification is determined to have occurred, further determining if the code modification affects the binary translation being executed.

Example 35 may include the elements of example 34, and may further comprise means for invalidating binary translations determined to be affected by the code modification.

Example 36 may include the elements of any of examples 32 to 35, wherein the means for generating the binary translation state map comprise means for determining a stop location and offset in the binary translation, means for forming a region from the native code based at least on the stop location, means for loading instructions from the region, means for determining the binary translation state map based at least on the size of the loaded instructions and means for mapping to a location in the native code by applying the offset to the binary translation state map.

Example 37 may include the elements of example 36, wherein the means for loading instructions from the region comprise means for determining whether each instruction to be loaded requires emulation, means for loading the instruction when it is determined that emulation is not required and means for generating one or more secondary instructions to emulate the instruction when it is determined that emulation is required.

Example 38 may include the elements of any of examples 32 to 37, and may further comprise means for mapping the occurrence of the stop in the binary translation to a native instruction address and a register context state using the binary translation state map.

Example 39 may include the elements of example 38, and may further comprise means for providing the native instruction address and the register context state to the at least one thread and means for deleting the binary translation state map.

Example 40 may include the elements of any of examples 32 to 39, and may further comprise means for mapping the occurrence of the stop in the binary translation to a native instruction address and a register context state using the binary translation state map, means for providing the native instruction address and the register context state to at least one thread executed by processing circuitry in the device and means for deleting the binary translation state map.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device including on-demand binary translation state map generation, the device comprising:
    memory circuitry including:
        native code memory configured to store a plurality of native code sections; and
        a translation cache configured to store binary translations, ones of the binary translations corresponding to respective ones of the native code sections;
    processing circuitry configured to:
        execute at least one native code section of the plurality of native code sections; and
    binary translation circuitry configured to:
        determine whether a binary translation of the at least one native code section is present in the translation cache;
        generating the binary translation of the at least one native code section responsive to the determination that the binary translation of the at least one native code section is not present in the translation cache;
        store the binary translation of the at least one native code section in the translation cache:
        determine that a stop has occurred during binary translation execution;
        determine a stop location and offset in the binary translation;
        form a region from native code based at least on the stop location;
        determine whether an instruction to be loaded requires emulation;
        load the instruction when it is determined that emulation is not required; and
        generate one or more secondary instructions to emulate the instruction when it is determined that emulation is required;
        subsequent to the determination that the stop has occurred, generate a binary translation state map of at least a portion of the binary translation based at least on a size of the instruction;
        map to a location in the native code by applying the offset to the binary translation state map;
        store, for at least a portion of a duration of the stop, the binary translation state map in the memory circuitry; and
        discard the binary translation state map from the memory circuitry upon termination of the stop.

2. The device of claim 1, wherein the binary translation circuitry is configured to store a start address of the at least one native code section and a region formation strategy used to generate the binary translation.

3. The device of claim 2, wherein the binary translation circuitry is configured to generate the binary translation state map utilizing the start address and the region formation strategy.

4. The device of claim 1, wherein the stop is caused by the binary translation circuitry determining that an exception or a code modification in a section of native code has occurred.

5. The device of claim 4, wherein the determination that a code modification has occurred causes the binary translation circuitry to determine if the code modification affects the binary translation being executed.

6. The device of claim 1, wherein the binary translation circuitry does not translate a third loaded instruction loaded from the region into binary code when generating the binary translation state map.

7. The device of claim 1, wherein the binary translation circuitry is configured to map the stop in the binary translation to a native instruction address and a register context state using the binary translation state map.

8. The device of claim 7, wherein the binary translation circuitry is configured to:
provide the native instruction address and the register context state to at least one thread prior to deletion of the binary translation state map.

9. A method for on-demand binary translation state map generation, the method comprising:
executing, by processing circuitry, at least one native code section of a plurality of native code sections;
determining, by binary translation circuitry, whether a binary translation of the at least one native code section is present in a translation cache;
generating, by the binary translation circuitry, the binary translation of the at least one native code section responsive to the determination that the binary translation of the at least one native code section is not present in the translation cache;
storing, by the binary translation circuitry, the binary translation of the at least one native code section in the translation cache;
executing, by the binary translation circuitry, the binary translation of the at least one native code section;
determining that a stop has occurred during the execution of the binary translation;
determining a stop location and offset in the binary translation;
forming a region from native code based at least on the stop location;
determining whether an instruction to be loaded requires emulation;
loading the instruction when it is determined that emulation is not required;
generating one or more secondary instructions to emulate the instruction when it is determined that emulation is required;
subsequent to the determination that the stop has occurred, generating a binary translation state map of at least a portion of the binary translation based at least on a size of the instruction;
mapping to a location in the native code by applying the offset to the binary translation state map;
storing, for at least a portion of a duration of the stop, the binary translation state map in memory circuitry; and
discarding the binary translation state map from the memory circuitry upon termination of the stop.

10. The method of claim 9, further including:
storing a start address of the at least one native code section and a region formation strategy used to generate the binary translation, wherein the binary translation state map is generated utilizing the start address and the region formation strategy.

11. The method of claim 9, further including:
determining whether the stop was caused by an exception or a code modification in a section of native code; and
when a code modification is determined to have occurred, further determining if the code modification affects the binary translation being executed.

12. The method of claim 9, further including:
mapping the stop in the binary translation to a native instruction address and a register context state using the binary translation state map.

13. The method of claim 12, further including:
providing the native instruction address and the register context state to at least one thread executed by processing circuitry.

14. At least one non-transitory storage medium comprising first instructions that, when executed, cause one or more processors to at least:
execute at least one native code section of a plurality of native code sections;
determine whether a binary translation of the at least one native code section is present in a translation cache;
generate the binary translation of the at least one native code section responsive to the determination that the binary translation of the at least one native code section is not present in the translation cache;
store the binary translation of the at least one native code section in the translation cache;
execute the binary translation of the at least one native code section;
determine that a stop has occurred during the execution of the binary translation;
determine a stop location and offset in the binary translation;
form a region from native code based at least on the stop location;
determine whether ones of second instructions require emulation;
load first ones of the second instructions that do not require emulation;
generate one or more tertiary instructions to emulate second ones of the second instructions that do require emulation;
subsequent to the determination that the stop has occurred, generate a binary translation state map of at least a portion of the binary translation based at least on a size of the second instructions;
map to a location in the native code by applying the offset to the binary translation state map;
store, for at least a portion of a duration of the stop, the binary translation state map in memory circuitry; and
discard the binary translation state map from the memory circuitry upon termination of the stop.

15. The at least one non-transitory storage medium of claim 14, wherein the first instructions are to cause the one or more processors to:
store a start address of the at least one native code section and a region formation strategy used to generate the binary translation, the binary translation state map to be generated utilizing the start address and the region formation strategy.

16. The at least one non-transitory storage medium of claim 14, wherein the first instructions are to cause the one or more processors to:
determine whether the stop was caused by an exception or a code modification in a section of native code; and
when a code modification is determined to have occurred, determine if the code modification affects the binary translation being executed.

17. The at least one non-transitory storage medium of claim 14, wherein the first instructions are to cause the one or more processors to:
map the stop in the binary translation to a native instruction address and a register context state using the binary translation state map.

18. The at least one non-transitory storage medium of claim 17, wherein the first instructions are to cause the one or more processors to:

provide the native instruction address and the register context state to at least one thread.

\* \* \* \* \*